June 7, 1938. A. L. WILSON 2,119,762
MEAT SLICING MACHINE
Filed July 5, 1935 3 Sheets-Sheet 3
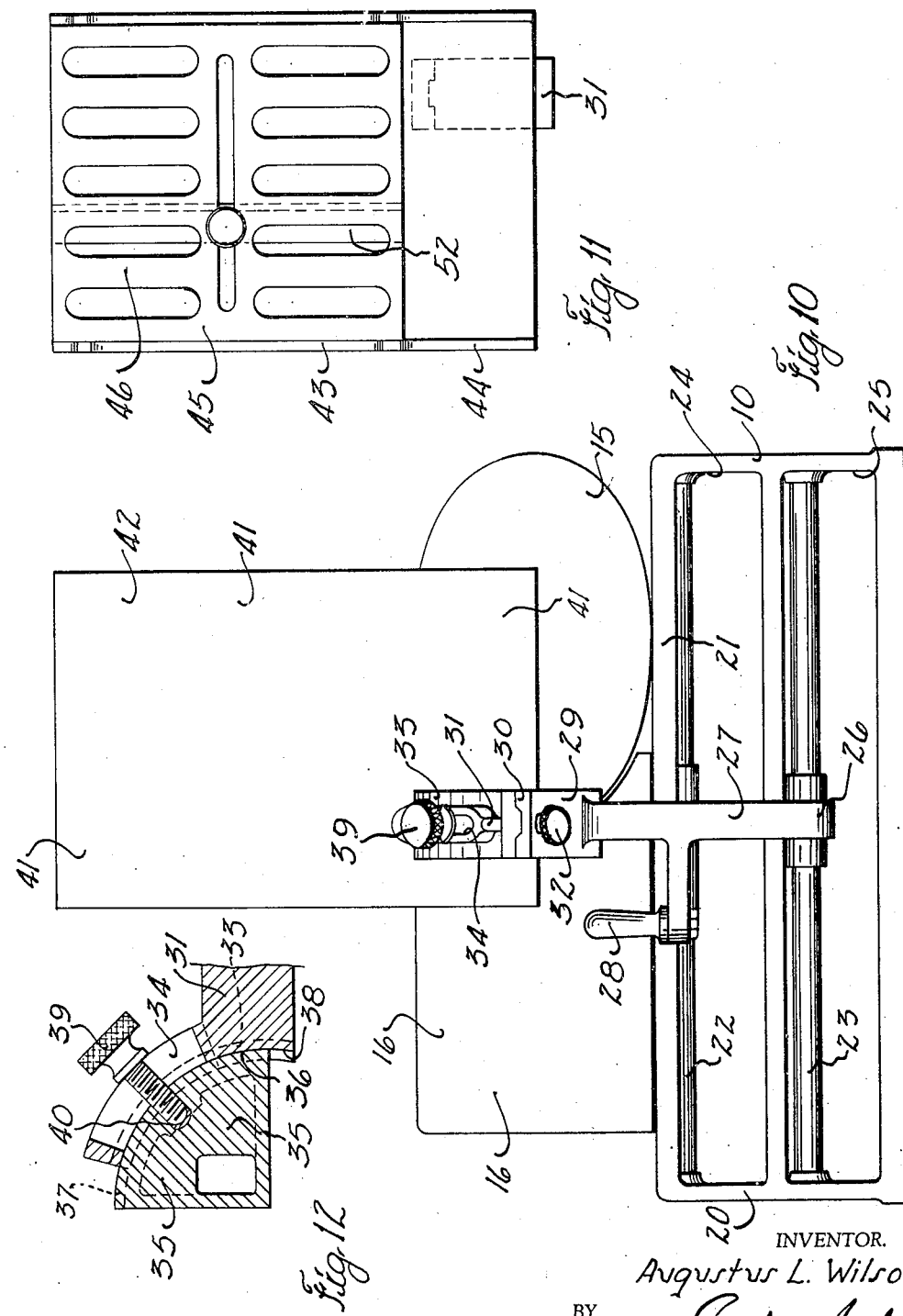
INVENTOR.
Augustus L. Wilson
BY
ATTORNEY.

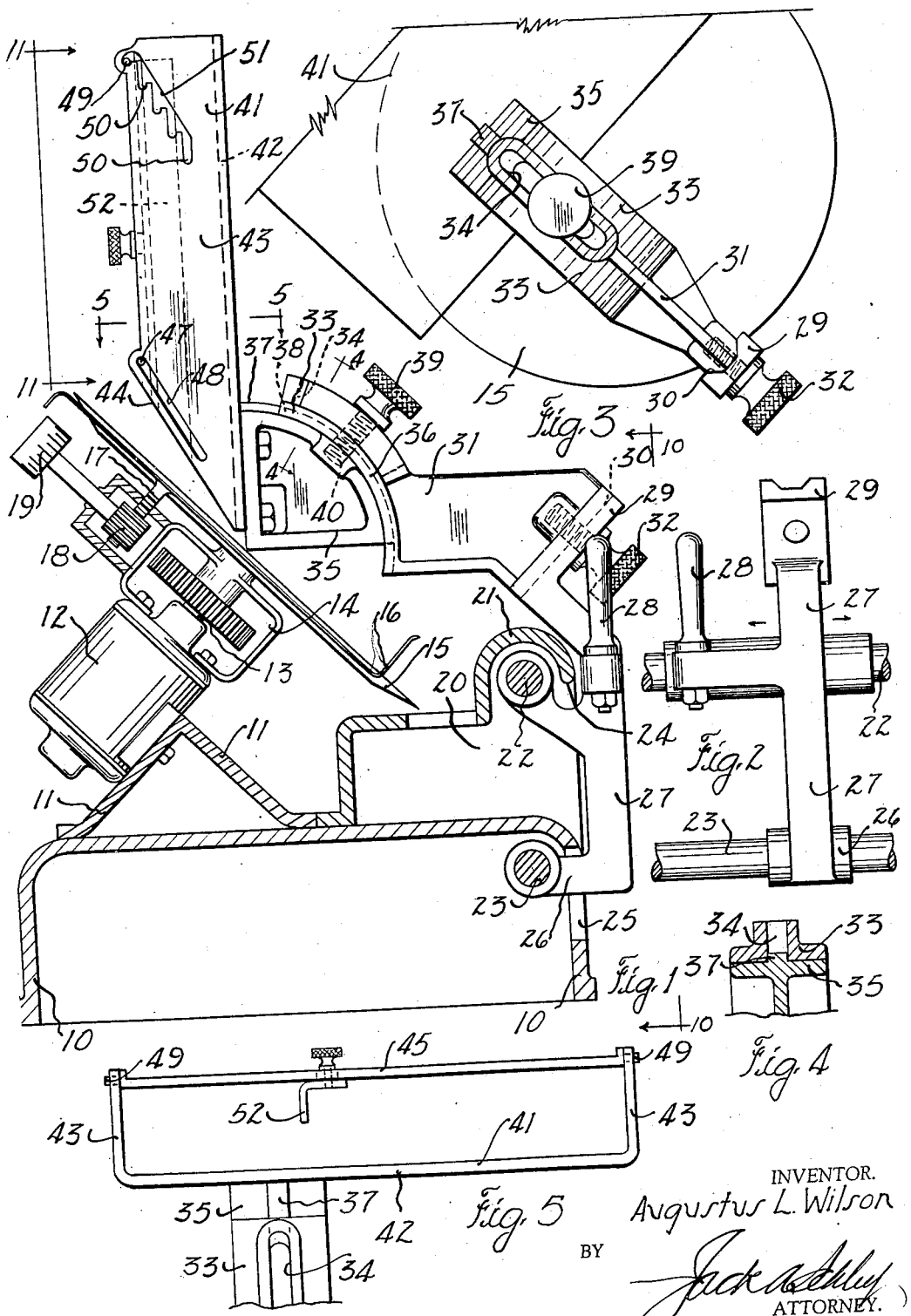

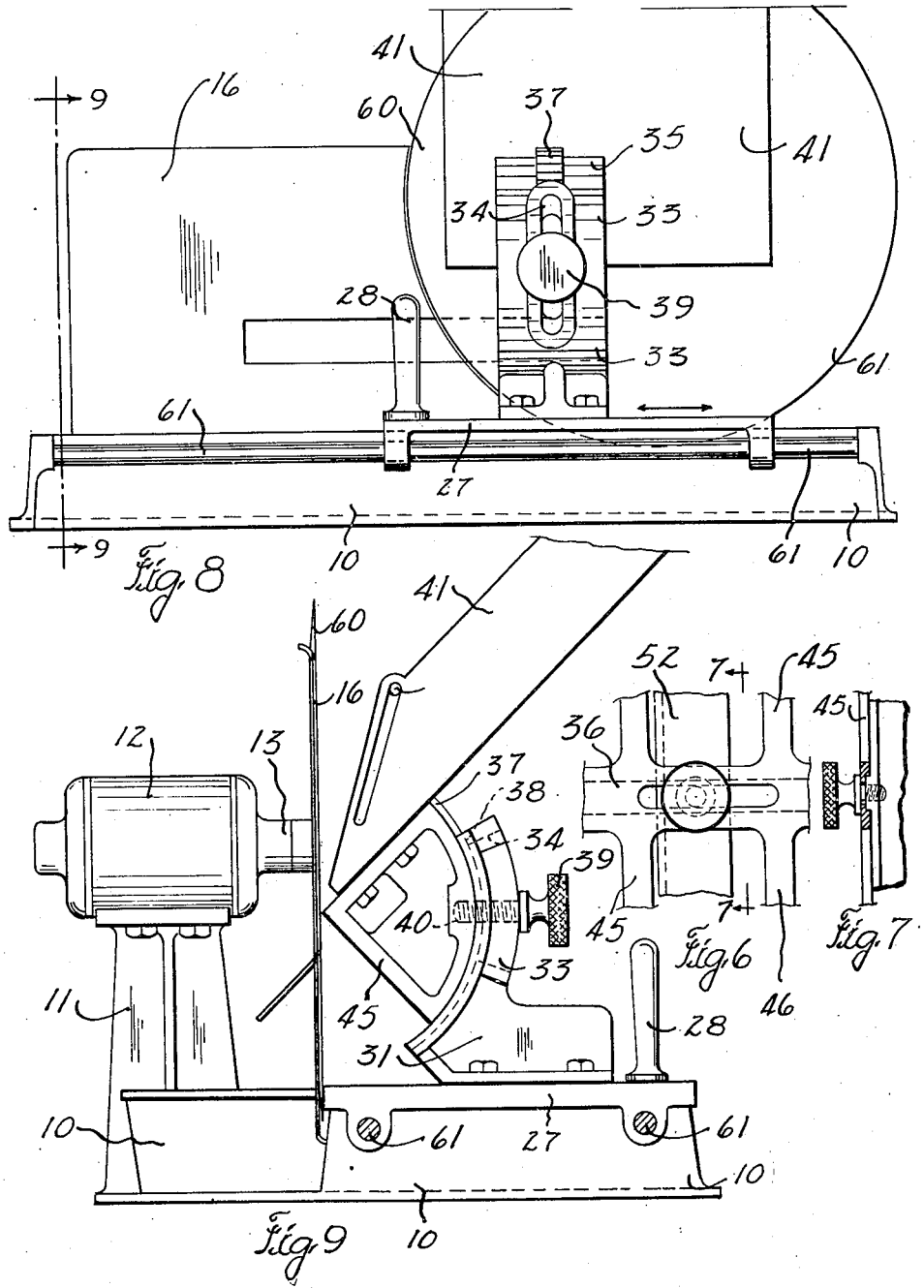

Patented June 7, 1938

2,119,762

UNITED STATES PATENT OFFICE 2,119,762

MEAT SLICING MACHINE

Augustus L. Wilson, San Antonio, Tex.

Application July 5, 1935, Serial No. 29,805

2 Claims. (Cl. 146—102)

This invention relates to new and useful improvements in meat slicing machines.

One object of the invention is to provide an improved meat slicing machine which will efficiently slice bacon, or other meat, at any desired angle.

An important object of the invention is to provide an improved attachment which may be applied to a meat slicing machine which includes an adjustable arcuate member which carries the supporting holder for the meat to be cut, said member being so arranged that the angle of the holder with relation to the cutting blade may be varied a maximum number of degrees.

Another object of the invention is to provide an improved meat slicing machine including a holder for supporting meat to be cut which is adjustable with relation to the cutting blade to vary the angle of the cut, said holder being arranged to accommodate various sizes and shapes of meats to be cut.

A further object of the invention is to provide an improved attachment for meat slicing machines which is arranged to be mounted on the sliding carriage of the machine, said attachment including an arcuate support having a quadrant carried thereby and adjustable with relation thereto, the center arc on which both support and quadrant are swung being in substantially the same plane as the cutter of the machine, whereby said center remains in the same plane regardless of the swing of the quadrant with relation to the support.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a transverse, vertical, sectional view of a meat slicing machine constructed in accordance with the invention.

Figure 2 is a partial side elevation of the movable carrier,

Figure 3 is a partial plan view of the machine,

Figure 4 is a transverse, sectional view, taken on the line 4—4 of Figure 1,

Figure 5 is a horizontal, cross-sectional view, taken on the line 5—5 of Figure 1, Figure 6 is a partial side elevation of the central portion of the meat holder, Figure 7 is a transverse, vertical, sectional view, taken on the line 7—7 of Figure 6, Figure 8 is a partial side elevation of another form of the invention, Figure 9 is a transverse, vertical, sectional view, taken on the line 9—9 of Figure 8, Figure 10 is a side elevation of the machine illustrated in Figure 1, looking in the direction of the arrows on the line 10—10, Figure 11 is a side view of the meat holder, looking in the direction of the arrows on the line 11—11 of Fig. 1, and Figure 12 is a detail sectional view illustrating the provision for adjustably mounting the supporting quadrant for the meat holder.

In the drawings, the numeral 10 designates the frame of a meat slicing machine. The frame may be of any suitable material and may be constructed in any desired manner. The frame is substantially rectangular in cross-section and has an angular bracket 11 secured to its top at one side thereof. The angular sides of the bracket are disposed at substantially a 45 degree angle and a suitable electric, or other motor 12 is secured to the outer angular side, whereby said motor is supported at a 45 degree angle with relation to the top of the frame.

The motor shaft 13 extends upwardly from the motor through a reduction gearing 14 which is suitably housed, and has a circular cutting disk 15 fastened on its outer end. Since the motor and its shaft are located at a 45 degree angle with relation to the horizontal top of the frame, it is obvious that the cutting disk is also disposed at a 45 degree angle with relation to the frame. Adjacent the cutter disk 15 and in the same plane with the cutting edge thereof is a longitudinal gage plate 16 which may be of any desired shape, and preferably extends the length of the frame. The plate is supported on gear racks 17 which are in constant engagement with pinions 18. Hand wheels 19 are fastened on the shaft of the pinions, whereby an adjustment of the plate may be had.

Each end of the frame 10 is provided with end members 20 which are mounted on the frame, and are preferably integral therewith. The end members 20 are connected by a hood 21 which extends the entire length of the frame. A longitudinal shaft 22 has its ends supported in the end members at the upper end thereof. A similar shaft 23 which is located in vertical alinement with the shaft 22 has its ends suitably supported in the ends of the frame 10. The side of the hood 21 is open at 24 while the side of the frame 10 is provided with a slot 25, whereby inwardly extending arms 26 of a carriage 27 may be engaged over the shafts 22 and 23 and the carriage slidable longitudinally of the frame. The carriage is provided with a suitable handle 28, whereby the carriage may be manually slid.

The carriage is provided with an upwardly extending bracket 29 which has its upper face 30 disposed at an angle of substantially 45 degrees with relation to the horizontal top of the frame 10. A horizontal supporting member 31 is suitably secured to the bracket 29 by a cap screw 32. As is clearly shown this member extends toward the angled cutting disk 15 and is provided at its inner end with an arcuate support 33. The disposition of this arcuate support is such that the center of the arc through which the support extends is in the same plane as the angled cutter disk 15. The member is an inverted T-shape (Figure 4) and has a slot 34 extending therethrough (Fig. 1).

A quadrant 35 is formed with an arcuate surface 36 complementary to the surface of the arcuate support and is mounted to swing on said support as is clearly shown in Figure 1. To prevent lateral displacement of the quadrant, a rib 37 is formed centrally on the arcuate surface 36 and this rib engages in a slot 38 formed in the underside of the arcuate surface of the support 33. The slot 38 extends throughout the entire length of the support and that portion opposite the slot 34 forms a continuation thereof since both are the same width, as clearly shown in Figure 4. To hold the quadrant in any position it is swung, a thumb screw 39 extends through the slots and has its inner end threaded into an opening 40 in the arcuate surface of the quadrant. It is obvious that by loosening the screw, the quadrant may be swung to any desired position. Since the arcuate surface of the quadrant is complementary to the arcuate support, the center of the arc on which said surface is swung is in the same plane with the cutter disk 15.

The quadrant is shown clamped in its central position (Figure 1) with one of its legs parallel to the horizontal top of the frame 10 and its other leg in a vertical position. It is obvious that from this position, the quadrant may be swung fifteen degrees in each direction, or a total of thirty degrees. Secured to the vertical leg of the quadrant is a meat holder 41. This holder comprises a casting which includes an elongated side wall 42 (Figure 5) and two end walls 43 which are made integral with the side wall. The top and bottom of the holder are open as is one longitudinal side thereof. The lower end 44 is cut off at an acute angle as is clearly shown in Figure 1.

The open side wall of the holder is closed by a face plate 45 which is formed of crossed flat bars 46 (Figure 6) which are preferably made integral therewith. Trunnions 47 are provided at the bottom of the face plate 45 and these trunnions engage in inclined slots 48 in the lower end of the end walls 43 of the holder, whereby the bottom of the face plate is supported. The upper end of the plate has similar trunnions 49 which are arranged to engage notches 50 formed along the lower end of an inclined slot 51 which is located near the top of the end walls 43. By observing Figure 1, it will be seen that by positioning the trunnions 49 in the various notches 50, the face plate 45 may be adjusted with relation to the back wall 42, whereby various thicknesses of bacon or meat slabs may be accommodated.

In operation, the meat slab to be cut is inserted in the holder between the face plate and back wall. A vertical retaining bar 52 which extends inwardly from the face plate and which is adjustable longitudinally thereof, is engaged with the end of the meat within the holder. Thus, the meat slab is held within the holder but it is pointed out that the engagement of the retaining bar and face plate is not so tight as to prevent gravity from causing the slab to feed downwardly through the holder.

After the slab is positioned within the holder it is obvious the lower end thereof extends from the bottom of the holder and engages the gage plate 16 which is located in a plane parallel with the cutting edge of the disk. The quadrant 35 is then adjusted to the desired position and as the carriage 27 is manually slid along the shafts 22 and 23 it is obvious that the meat is sliced. The position of the gage plate, of course, determines the depth of the cut, or the thickness of the slice. It will be seen that the angle of the cut may be varied 30 degrees if desired. The adjustments are made quickly and easily and the holder is constructed to receive most any width of bacon slab, meat loaf, etc.

The quadrant and its support may be attached to any slicing machine having a movable carriage. It is not essential that the cutting disk be mounted at an angle as in Figure 1. In Figures 8 and 9, I have shown the invention attached to a slicing machine having a cutter 60 which is disposed vertically. In this form, the carriage is slidable on longitudinal shafts 61 and the arcuate support 33 is mounted directly on the carriage. The center of the arc through which the arcuate surface of the support is disposed is in the same plane as the cutter disk. Since the rest of the parts are the same as in the first form and the operation is exactly the same, a detailed discussion would merely be repetition.

What I claim and desire to secure by Letters Patent is:

1. In a slicing machine of the character described, a supporting frame, a rotary cutter blade mounted on said frame, an adjustable gage plate associated marginally with said blade, the plate being movable to locate its face in different planes parallel with the face of the blade for varying the thickness of the slice, a carriage mounted on the frame to reciprocate transversely with respect to the gage plate and cutter blade, a bracket member mounted on the carriage to reciprocate therewith, said bracket member having a hollow arcuate end portion opposed to said gage plate and cutter blade and formed on a radius from a plane approximately that of the face of the cutter blade, a quadrant having a counterpart peripheral portion rotatably fitted to said hollow arcuate portion of the bracket member and being thereby adjustably supported, means for releasably locking said quadrant in its adjusted positions, and a meat holder mounted on a radial side of said quadrant with the end of its meat-supporting bottom terminating in close proximity to the axis of the quadrant.

2. The combination in a slicing machine of the character described and including a rotary cutter blade, and a carriage mounted to reciprocate transversely of the blade, of an adjustable meat holder support mounted on the carriage to travel therewith, said support comprising a bracket member detachably mounted on the carriage and having an end portion provided with an arcuate recess formed on a radius from a plane approximately that of the face of the cutter blade and being grooved and slotted lengthwise, an adjustable quadrant having its peripheral portion formed on the same radius and as a counterpart of the arcuate grooved recess of said bracket member to rotatably fit the same and be thereby supported, and a clamping screw extended through the slotted portion of the bracket member and engaging said member and said quadrant to releasably lock the quadrant in its adjusted positions, the supporting bottom of the meat holder being mounted on a radial side of said quadrant and terminating in close proximity to the axis of the quadrant.

AUGUSTUS L. WILSON.